May 22, 1956 — O. J. POUPITCH — 2,746,506
SCREW AND WASHER ASSEMBLY
Filed Aug. 12, 1952
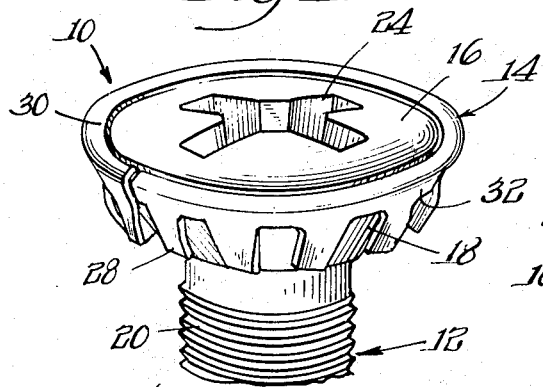
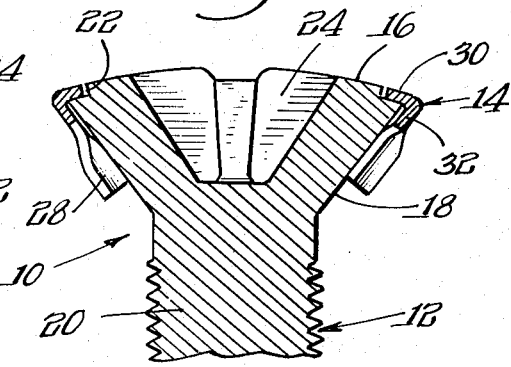
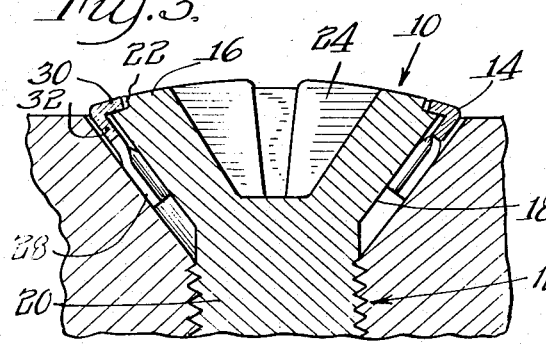
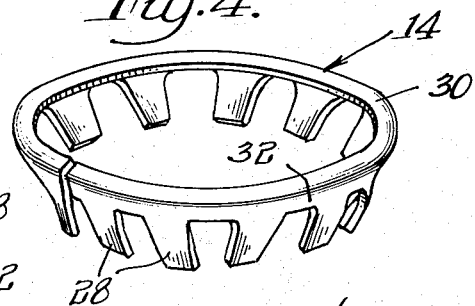
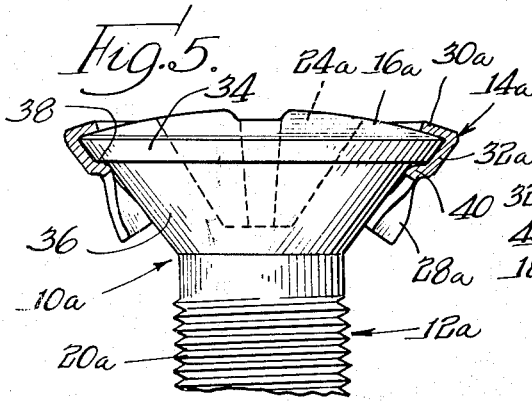
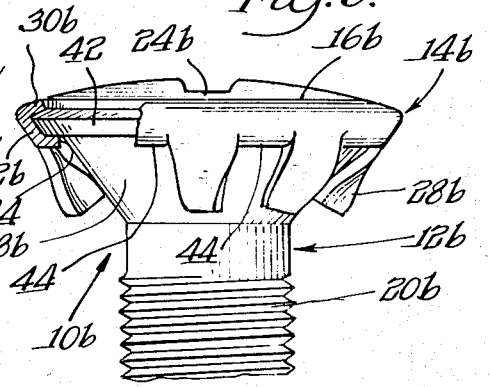
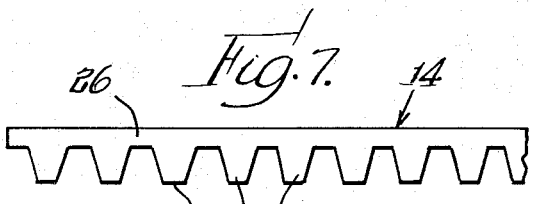
INVENTOR,
Ougljesa Jules Poupitch
By: Moore, Olson & Trexler
attys

United States Patent Office 2,746,506
Patented May 22, 1956

2,746,506

SCREW AND WASHER ASSEMBLY

Ougljesa Jules Poupitch, Itasca, Ill., assignor to Illinois Tool Works, Chicago, Ill., a corporation of Illinois Application August 12, 1952, Serial No. 303,889

3 Claims. (Cl. 151—37)

This invention is concerned with a preassembled fastener unit comprising a rotary fastener and a lockwasher, specifically a countersunk or conical headed screw and conical lockwasher.

Preassembled screws and lockwashers are now well known in the art and have been widely accepted in the industry due to the simplified installation and savings in time brought about by the handling of only one unit instead of two separate parts. Many such assemblies or preassembled units have been perfectly satisfactory in all respects. Certain difficulties, however, have been encountered in the production or in handling or in installation of preassembled units of countersunk screws and lockwashers.

Heretofore, screw blanks generally have been assembled with lockwashers and threads then have been rolled on the screw shank to trap the washers permanently in place. This has severely restricted the choice of metals used for the screws and for the lockwashers as the ensuing heat treatment necessary to complete the screws and the washers affects dissimilar metals differently. Therefore it generally has been necessary to reach a compromise between the hardness characteristics necessary to cause a washer to bite into the screw and a workpiece to resist reverse rotation, and the tensile strength, appearance, and finish (as affecting resistance to corrosion and self-lubrication in threading into place) necessary in a screw.

An object of this invention is to provide a preassembled countersunk screw and washer unit wherein the screw and washer are completely finished individually prior to assembly.

Another object of this invention is to provide a preassembled countersunk screw and lockwasher unit which is more readily produced than any heretofore known in the art.

In certain applications of countersunk screw and lockwasher units, fastening the door hinges on automobiles and refrigerators being exemplary, hands, clothing, and other objects are constantly passed by the screw heads. This makes it imperative that the screw head and washer form a substantially continuous surface with the cooperating workpiece, i. e. the screw head and washer must be flush with the face of the workpiece with no projections on which hands, clothing, and the like could catch.

Accordingly, it is an object of this invention to produce a preassembled countersunk screw and lockwasher having a flush upper surface free of entangling projections.

A further object of this invention is to provide a preassembled countersunk screw and lockwasher having locking teeth positioned to avoid engaging and entangling with the surroundings including other fastener units.

To achieve the above and other objects, my invention contemplates the use of a split ring lockwasher allowing easy assembly after completion of the washer and the screw wherein the split ring forms a body portion having a flange projecting inwardly above a frusto-conical screw head and crimped or otherwise secured about the peripheral edge of said frusto-conical screw head. A flush upper surface is produced by positioning the flange in an annular recess in the screw head. Twisted locking teeth extend conically downwardly and inwardly from the split ring and have their free ends disposed toward the screw shank where they cannot entangle with or endanger the operator or surroundings. In one embodiment of my invention, precise positioning of the screw head and washer is provided by an offset portion of the screw head, and in another embodiment such positioning is accomplished by retaining projections on the washer cooperating with a rim on the screw head.

An advantage stemming from the construction outlined above is that the washer is wasteless. More specifically, complementary washer blanks can be stamped from a strip or ribbon of metal with no scrap being formed.

Other and further objects and advantages of the present invention will be apparent from the following description when taken in connection with the accompaying drawings wherein:

Fig. 1 is a perspective view of one form of an assembly or fastener unit constructed in accordance with the principles of my invention;

Fig. 2 is a longitudinal sectional view through the screw and lockwasher;

Fig. 3 is a view similar to Fig. 2 with the fastener unit in installed position;

Fig. 4 is a perspective view of the washer shown in Figs. 1–3;

Fig. 5 is a side view of a modified form of fastener unit with the washer shown in cross section;

Fig. 6 is a side view showing another form of the fastener unit with the washer partially broken away; and Fig. 7 is a plan view of the washer blank.

Referring first to the embodiment shown in Figs. 1–4, there may be seen a fastener unit generally designated by the numeral 10 and including a screw 12 and a lockwasher 14. The screw is of the countersunk type having an oval head 16 provided with a frusto-conical clamping surface or face 18. The shank 20 of the screw is shown as threaded almost to the clamping face 18 of the screw head, but it will be understood that the shank may be threaded over a greater or lesser part of the shank as may be desired. The outer peripheral edge of the screw head 16 is provided with an arcuate groove 22 for cooperation with the lockwasher 14 as will be apparent shortly, and the screw is completed by a driving slot or socket 24 shown by way of illustration as a cruciform socket.

The lockwasher 14 is of the split ring type and is formed from a ribbon or strip of metal 26 as shown in Fig. 7. A plurality of spaced teeth 28 extend from one side of the strip 26. Two such washer blanks can be stamped from the ribbon with the teeth complementary, as will be obvious, without the formation of any scrap. The washer therefore is wasteless and very economical to produce. The teeth 28 are twisted and the strip 26 is bent into circular configuration and is folded or creased longitudinally to form a body portion having an upper flange 30 adapted to lie in the groove 22 of the screw head, and a frusto-conical under portion 32 adapted to lie along the clamping face of the screw head with the twisted teeth 28 extending conically inwardly along the clamping face of the screw head.

The free ends of the locking teeth, extending inwardly toward the screw shank, are in relatively inaccessible position where there is little danger of their snagging an operator's fingers or entangling with the surroundings including other fastener units. When the screw is threaded into an aperture in a workpiece, the lockwasher teeth 28 are flattened out considerably as shown in Fig. 3. Their resiliency causes the teeth frictionally to engage the workpiece and the clamping face of the screw and also to bite into these surfaces to resist reverse rotation tending to cause the screw to become unscrewed. The top flange 30 of the washer and the top surface of the screw head 16 form a substantially flush or continuous smooth surface when in installed position as shown in Fig. 3 so that there is little likelihood of anything catching on the screw head or on the lockwasher.

A modified form of the fastener unit or assembly is shown in Fig. 5 and is identified generally by the numeral 10a. The screw 12a is generally similar to the screw 12 heretofore described and is provided with a threaded shank 20a and an oval head 16a having a cruciform driving socket or slot 24a. The screw 12a differs from the screw 12 previously described in that the groove 22 is omitted and the clamping face is formed with two portions 34 and 36, the latter being inwardly offset from the former and joined thereto by a shoulder 38.

The lockwasher 14a of the assembly or fastener unit 10a is generally similar to the lockwasher 14 previously disclosed and is provided with an upper flange 30a, a lower portion or flange 32a, and twisted, conically inwardly extending locking teeth 28a. The lockwasher 14a differs from the washer 14 in that the lower portion or flange 32a is extended and is folded inwardly to form a shoulder at 40 underlying the shoulder 38 of the screw head. The upper clamping surface 34 with the shoulder 38 forms, in effect a bead and the fitting of the portions above and below this bead positively insures precise positioning of the washer relative to the screw head. Operation of the assembly or fastener unit 10a is identical with that of the assembly or fastener unit 10, and description of the operation therefore is unnecessary.

Another embodiment of my invention is shown in Fig. 6 wherein the fastener unit is identified generally by the numeral 10b. The screw 12b in this case is generally similar to the screws previously described and has a threaded shank portion 20b and an oval head 16b provided with a cruciform driving socket or slot 24b and having a frusto-conical clamping face 18b. The head 16b is provided with a peripheral, arcuate bead 42 which is generally trapezoidal in cross section. The washer 14b is similar to the washer 14 originally disclosed and has a body portion comprising an upper flange 30b and a lower portion or flange 32b with twisted locking teeth 28b extending conically inwardly therefrom. The lockwasher 14b is further provided with short tabs or retainer sections 44 on the edge of the lower body portion 32b between the teeth and underlying the bead 42. The flange 30b and retainer sections 44 cooperating with the bead 42 positively prevent axial displacement of the washer relative to the screw head, and precise positioning therefore is insured.

It will be understood that in each of the embodiments shown and described the body portion of the lockwasher is in the form of a split ring and that the entire washer including both the body portion and the teeth is hardened to hold the ring about the screw head and to facilitate the gripping action of the teeth.

The split ring feature of the lockwasher enables the washer to be snapped readily on the screw head after formation of the washer. The top flange of the washer forming, in effect, an overhanging lip on the main or lower body portion positively prevents separation of the lockwasher and screw. It will be understood that the lock washer, while fitting fairly snugly about the screw head, fits sufficiently loosely to insure free rotation of the screw relative to the washer while the fastener unit is being threaded into position. The flange or lip fitting in a recess forms a substantially flush surface with the screw head while the inwardly projecting teeth are in a relatively inaccessible position where they will not encounter or become entangled with any associated object or surroundings.

The particular embodiments of the invention shown and described will be understood as being for illustrative purposes only, and the invention will be understood as including all that which falls within the spirit and scope of the appended claims.

I claim:

1. A preassembled fastener unit comprising a screw member having a threaded shank and a head with a conical clamping surface at one extremity of the shank and an annular recess around the peripheral edge of the head, and a lockwasher including an annular body portion in the form of a split ring encircling the periphery of the head along its area of maximum diameter, integral locking prongs extending from said body portion toward the threaded shank and having tooth sections positioned in adjacent operative position with respect to said conical clamping surface, said body portion including a flange extending inwardly in overlying relation with respect to the outer margin of the head and positioned in said annular recess substantially flush with the adjacent surface of the head, said flange being substantially continuous from one extremity of the split ring to the opposite extremity thereof, and the tooth sections adjacent the conical clamping surface providing a diameter less than the maximum diameter of said head.

2. A preassembled fastener unit as claimed in claim 1, wherein the clamping surface is undercut adjacent the head and a section of the washer body portion is bent inwardly to underlie the undercut surface.

3. A preassembled fastener unit as claimed in claim 1, wherein the head of the screw is provided with a peripheral bead below said annular recess and wherein the body portion of the washer is provided with a plurality of tabs between the tooth sections projecting inwardly to underlie said bead.

References Cited in the file of this patent

UNITED STATES PATENTS

| | | |
|---|---|---|
| 1,487,610 | Schatzel | Mar. 18, 1924 |
| 1,725,440 | Carns | Aug. 20, 1929 |
| 1,788,735 | Olson | Jan. 13, 1931 |
| 1,874,462 | Crowther | Aug. 30, 1932 |
| 1,882,089 | Olson | Oct. 11, 1932 |
| 2,225,654 | Olson | Dec. 24, 1940 |
| 2,257,959 | Hoppenstand | Oct. 7, 1941 |
| 2,424,208 | Poupitch | July 15, 1947 |

FOREIGN PATENTS

| | | |
|---|---|---|
| 665,046 | Germany | Sept. 15, 1938 |